July 25, 1967

D. SILVERMAN 3,332,511

OBTAINING SEISMIC TRAVEL TIME BY CROSS-CORRELATING THE RECEIVED
SIGNAL WITH VARIOUS PORTIONS OF THE TRANSMITTED SIGNAL

Filed June 18, 1964

DANIEL SILVERMAN
INVENTOR.

BY V. Newell Pottorf

ATTORNEY.

July 25, 1967  D. SILVERMAN  3,332,511
OBTAINING SEISMIC TRAVEL TIME BY CROSS-CORRELATING THE RECEIVED
SIGNAL WITH VARIOUS PORTIONS OF THE TRANSMITTED SIGNAL
Filed June 18, 1964  2 Sheets-Sheet 2

DANIEL SILVERMAN
INVENTOR.

BY Newell Pottoff

ATTORNEY.

United States Patent Office 3,332,511
Patented July 25, 1967

3,332,511
OBTAINING SEISMIC TRAVEL TIME BY CROSS-CORRELATING THE RECEIVED SIGNAL WITH VARIOUS PORTIONS OF THE TRANSMITTED SIGNAL
Daniel Silverman, Tulsa, Okla., assignor to Pan American Petroleum Corporation, Tulsa, Okla., a corporation of Delaware
Filed June 18, 1964, Ser. No. 376,148
1 Claim. (Cl. 181—.5)

This invention relates to seismic geophysical surveying, and is directed to travel-time measurements using signals in the form of vibrations extending over substantial periods of time. More particularly, the invention is directed to an improvement in vibratory-signal measurement of travel times, simultaneously employing a plurality of input signals in such a way as to utilize the signal transmission properties of the medium being investigated to a maximum extent.

In seismic geophysical surveying using a vibratory input function applied to the earth by one or more vibration generators, the input signal most commonly takes the form of a single frequency sweep between upper and lower limiting frequencies in either direction. Its time duration is substantial—generally, but not necessarily, at least equal to the travel time to be determined. To resolve closely similar travel times, the highest frequencies that can be transmitted are desirable, but these are the frequencies attenuated by the earth most strongly and in varying amounts. To receive these higher frequencies, it is necessary to try to compensate for their attenuation by increasing their intensity or the time during which they are introduced into the earth.

In routine geophysical surveying utilizing vibratory sweep signals as input, it is a common practice to perform initiation tests in a prospecting area by trying a number of different signal-frequency sweeps of varying range and duration, to determine the type or types of signal which produce the most consistent results. As a substantial amount of time and expense is involved in making such preliminary tests, it is impractical to repeat them for each point or even for a substantial fraction of the prospecting points, in a survey area. Consequently, a frequent result is that the form of vibratory input signal chosen for use in a given area may fail to utilize the full range of signal input frequencies which the ground will transmit from any given input location.

A further disadvantage in the use of a vibratory sweep input signal that covers a wider frequency range than the earth will transmit at a given location, is that cross correlation between the input signal, or some counterpart of it, and the received signal, which is the preferred way of determining travel times utilizing such signals, may produce less distinctive correlation wave forms than if the frequency sweep is limited to the range of signals actually transmitted. That is, the correlation function resulting from a frequency sweep over a wide range of frequencies which are only partially transmitted, produces smaller peak values indicating travel times than does a sweep through a narrower frequency range substantially all of which is more or less uniformly transmitted to the receiving point. Nevertheless, it has not heretofore been practtical to determine for each setup of the source and receiver spread the exact range of frequencies which is best transmitted.

In view of the foregoing, it is a primary object of my invention to provide, in seismic surveying utilizing vibratory input signals, a method and apparatus which automatically utilize the full frequency-transmission band of the earth at any surveying location, regardless of what that may be. Another object is to provide such a surveying system wherein a plurality of vibratory sources are employed in such a way as to provide a high level of the received signal throughout the entire duration of the signal input, regardless of the frequency range of signals transmitted by the earth. A still further object is to provide such a method and apparatus wherein the form of the signals utilized permits a subsequent choice of the optimum form of counterpart signal for cross correlation with the received waves, in the interpretation to determine travel times. Other and further objects, uses, and advantages of the invention will become apparent as the description proceeds.

Briefly stated, the foregoing and other objects of the invention are accomplished by utilizing a plurality of sweep frequency functions, each extending throughout the duration of the time of input of the signal to the ground, transmitting the sum of the plurality of frequency-time functions through the earth to a detector location, detecting and recording the received signals, and subsequently cross-correlating the received signals with some counterpart of the original frequency-time functions either individually or as some summation of part or all of the separate functions. Preferably, the individual frequency-time functions, of which the sum is transmitted through the earth, provide at all times during the duration of signal input at least one signal frequency which will be efficiently transmitted.

That is, although one or more of the frequency-time functions may extend over a wider frequency range than the earth can accept and transmit at a given input location, at any instant when one of the functions may be partially or completely cut off due to earth obsorption, at least one other of the multiple time functions will be transmitting at a frequency within the earth's accepted range. Accordingly, throughout the entire time duration of the input signal, there is at least one and preferably a plurality of signal frequencies capable of being transmitted through the earth. In addition, for at least part of the duration of signal input, at least one or more of the frequency-time functions attains some desired high frequency even though that may be above the range which the earth will transmit. Accordingly, at every input location, the entire frequency range which is desired to be transmitted through the earth from that location is applied to the earth, at every instant of signal input there is at least one frequency being applied to the earth which it will efficiently transmit, and the plurality of different frequency input functions provides a plurality of choices for the counterpart function to be utilized in the cross-correlation analysis of the received signals.

This will be better understood by reference to the accompanying drawings forming a part of this application and showing a typical embodiment of the invention and representative forms of the input signals which may be utilized in accordance therewith. In these drawings, FIGURE 1 shows a schematic wiring diagram of an apparatus for generating, receiving, and recording field data according to the invention;

Figure 1:
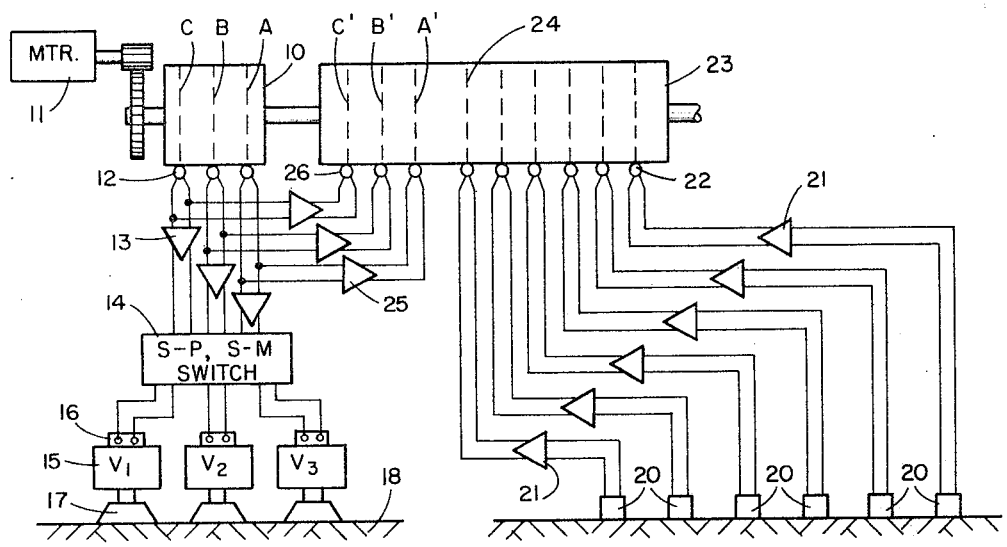

Referring now to these drawings and particularly to FIGURE 1, this figure shows diagrammatically one form of field apparatus for producing input signals and making field records in accordance with my invention. Thus, the input signals A, B, C may comprise corresponding traces pre-recorded on a magnetic tape or drum 10 arranged for rotation at constant speed by a motor 11. Adjacent to the drum 10 and the respective traces A, B, C are corresponding magnetic reproducing heads 12 each connected through an amplifier 13 and switching unit 14 to a servo-controlled vibrator 15. Each vibrator 15 is of known conventional form and comprises, for example, a heavy central mass, a servo or drive unit 16 to which the desired signal is applied from the switching unit 14 and an internal power mechanism controlled by the unit 16 to drive a foot piece or base plate 17 in contact with the earth's surface 18, to impress thereon the desired vibration pattern which corresponds to any one or combination of the traces A, B, C. The showing of three vibrators 15 is to be understood as diagrammatic only, since the invention contemplates the simultaneous use only of a plurality of input signals, as carried by drum 10, and the energy input into the ground can be performed by any number of vibrators, from one up to whatever is needed depending on local ground conditions.

Also as shown by FIGURE 1, the signals so impressed on ground surface 18 are detected at some remote location by a number of seismometers or seismometer groups 20 each connected through a corresponding amplifier 21 to a corresponding recording head 22 to place a separate trace 24 on the record-receiving magnetic drum 23, preferably also rotated by the motor 11 in synchronism with drum 10. As will be understood, the showing of six seismometers 20, six amplifiers 21 and recording heads 22 and six recorded traces 24 is diagramatic only, in that they schematically represent any desired number and arrangement of seismometers and corresponding recording channels and traces. Preferably, there is also recorded on the drum 23 by a corresponding head 26 and recording amplifier 25 each of the traces A, B, and C as a corresponding or counterpart trace A', B', C'. Thus, the record or drum 23 contains in fixed time relation the counterpart traces A', B', C' as well as the received-wave traces 24 for subsequent use in the analyzing correlator.

Figure 2:
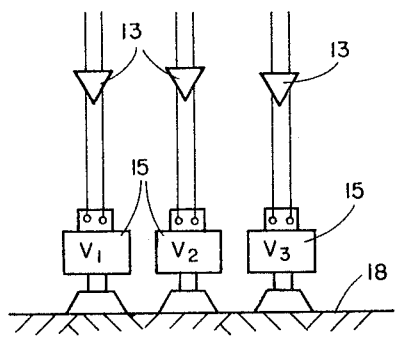
FIGURES 2 and 3 are schematic wiring diagrams showing different interconnections of the apparatus of the generator portion of FIGURE 1.
Figure 3:
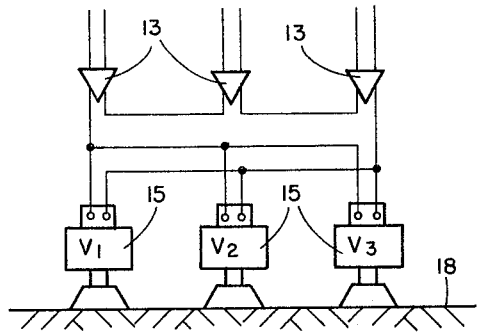

It is the function of the switching panel 14 to provide at least two choices for interconnection of the amplifiers 13 and the vibrators 15, respectively as shown in FIGURES 2 and 3. Thus, as appears in FIGURE 2, each separate signal A, B, or C may be applied directly to a separate one of the vibrators $V_1$, $V_2$, $V_3$ for application to the ground surface 18. Alternatively, as shown by FIGURE 3 the panel 14 may provide for adding together the outputs of amplifiers 13 and applying the summation output in parallel to the three vibrators $V_1$, $V_2$, $V_3$. In either case, it will be understood that the signal transmitted through the ground is essentially a summation signal of the traces A, B, and C, either as formed within the ground itself by the arrangement of FIGURE 2, or as applied to the vibrators in parallel by the circuit connections of FIGURE 3. This combined signal of FIGURE 3 could also be applied to a single vibrator if desired, for example, the vibrator $V_1$ alone in this figure, vibrators $V_2$ and $V_3$ being omitted if the energy input into the ground by one vibrator is sufficient.

Figure 4:
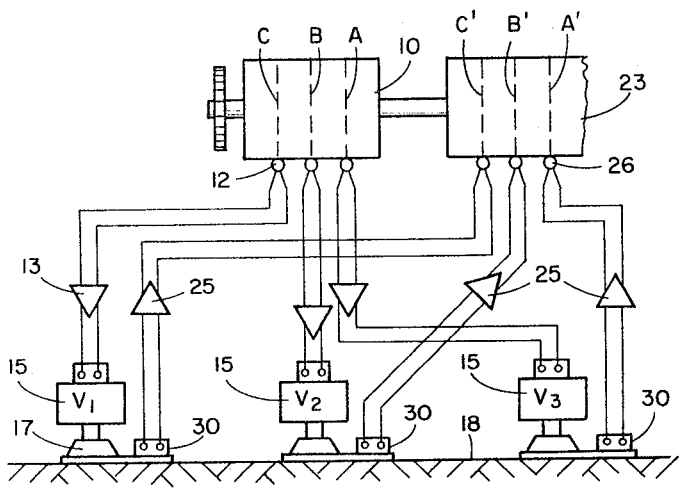
FIGURE 4 is a schematic wiring diagram of an alternative form of vibrator input function apparatus.

In FIGURE 4 is shown an alternative mode of recording the counterpart traces A', B', C'. Instead of recording directly the output of a corresponding reproducing head 12 through the amplifier 25 and recording head 26, each of the corresponding amplifiers 25 and recording heads 26 is supplied with a signal from a vibration detector or seismometer 30 attached to the base plate 17 of a corresponding one of the vibrators $V_1$, $V_2$, $V_3$. In this way, it is insured that the counterpart signal A', B', C', is an exact replica of the signal being applied by the corresponding vibrator $V_1$, $V_2$, or $V_3$ to the earth's surface 18.

Figure 5:
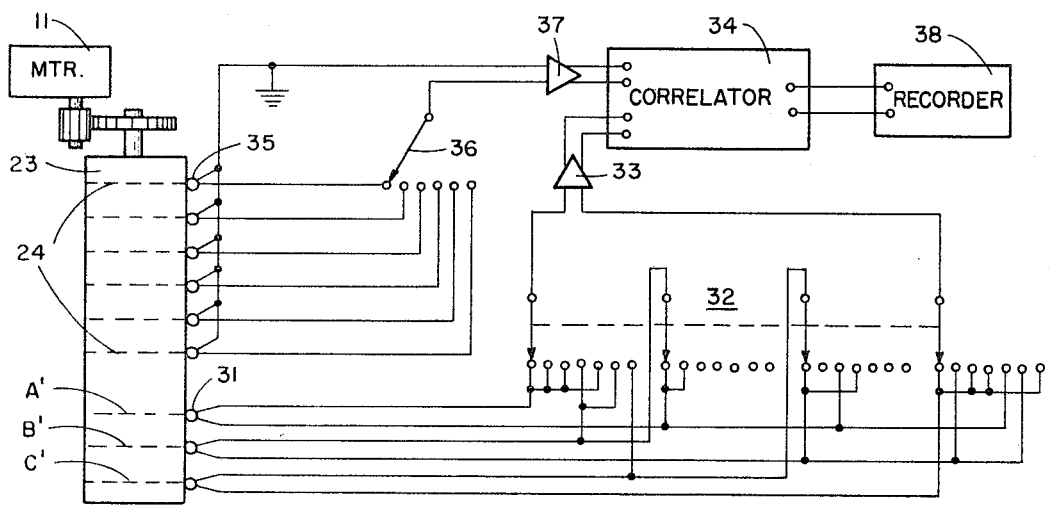
FIGURE 5 is a schematic wiring diagram of a playback apparatus for interpreting records made by the apparatus of the foregoing figures.

In FIGURE 5 is shown schematically an embodiment of a playback apparatus for reproducing the recorded traces and making correlation functions to show travel times of the seismic events recorded on the drum 23. Thus, each of the counterpart traces A', B', C' is reproduced by a corresponding one of three reproducing heads 31 respectively connected through a switching matrix 32 and a reproducing amplifier 33 to one set of input terminals of a correlator system 34. Each of the received-signal traces 24 is reproduced by a corresponding pickup head 35 connected through a selector switch 36 and amplifier 37 to the other pair of input terminals of the correlator 34. Connected to the output of the correlator 34 is a recorder 38 for recording, as a function of the delay time between the counterpart signal applied through amplifier 33 and the received-wave signal from amplifier 37, the correlation function for the particular detector involved. Inspection of the switching matrix 32 will show that it is a four-pole 7-position switch so connected as to provide as the counterpart signal any combination of the individual traces A', B', C' individually or in summation. That is, with the switch 32 in the position illustrated, the signal to amplifier 33 is the sum $A'+B'+C'$. As the movable switch contactors move to the right, each successive switch position respectively applies to the amplifier 33 the quantities $A'+B'$, $A'+C'$, $B'+C'$, A', B', and C'.

Figure 6:
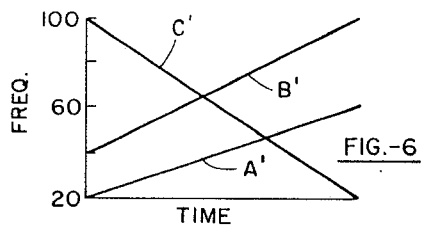
FIGURES 6 through 11 are graphs of representative time functions employed by the apparatus of the invention.

The significance of doing this may be better understood by reference to FIGURES 6 through 11. As is shown in FIGURE 6, where the instantaneous values of the vibrator frequencies during various frequency sweeps are plotted against time, representing the duration of input of signals into the ground by the vibrators 15, each of the three signals A', B', C' represents a linear frequency sweep of different character. For example, sweep A' represents a linear frequency sweep from a low value, a frequency such as 20 cycles per second to an intermediate value such as 60 cycles, during the time interval of signal application. This latter is ordinarily at least equal to the maximum travel time of interest and may be longer. The sweep B' represents a linear sweep starting from a frequency somewhat above 20 cycles but still in the low range and proceeding at a somewhat higher rate of change to a relatively high value such as 100 cycles per second. The sweep C' represents a wide-range sweep starting, for example, at the high frequency of 100 cycles and decreasing linearly to a low of, for example, twenty cycles during the period of signal application. As will be apparent from FIGURE 6, at all times during the signal input, at least two of the three vibrators are operating in a range of sixty to seventy cycles per second or lower, where signal attenuation is usually small, while the sweeps B' and C', at different portions of the signal input period, provide high frequencies for increased resolution of travel times, in the event that the ground will accept and transmit them. In order to be sure that the highest possible frequency is used, at least one of the sweeps will generally start with, pass through, or conclude with a frequency high enough to be above the upper limiting frequency that is substantially completely attenuated along the travel paths being measured. It is not essential, however, that the highest frequency exceed this upper cut-off limit if the high frequency actually attained and transmitted provides the desired resolution.

In operation, therefore, signals of frequency-sweep characteristics shown by FIGURE 6 are placed on the drum 10 of the apparatus of FIGURE 1 and applied to the ground through the connection of either FIGURE 2 or FIGURE 3 to the vibrators 15, and the resulting signals received at seismometers 20 are recorded as corresponding traces 24 on the drum 23. Simultaneously the counterpart signals A', B', C' are recorded on drum 23. In playback, the signals A', B', C' are simultaneously reproduced by the heads 31, while a selected one of the traces 24 is chosen for correlation by the selector switch 36 which connects to an appropriate one of the playback heads 35. By manipulation of the switching matrix 32, any one or any combination of the three counterpart signals A′, B′, C′ is correlated with the chosen one of traces 24 by the correlator 34, and the resulting correlation trace is recorded by the recorder 38. Different settings of the switch 32 provide different effective frequency ranges for the counterpart signal, so that with the several combinations available from which to choose, it is almost always possible to find one counterpart signal that covers an optimum range of frequencies.

Figure 7:
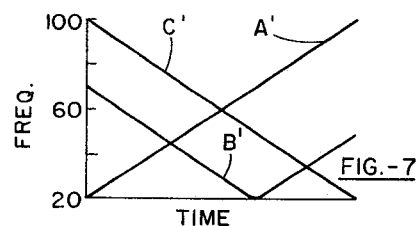

A quite wide variety of possible forms of the individual counterpart signals A′, B′, C′ can be used. FIGURE 7, for example, shows two sweeps A′ and C′ varying over the same rather wide frequency range at the same rate but in opposite directions; that is, one is an upsweep while the other is a downward frequency sweep. The sweep B′, by reversing its direction of frequency change at an intermediate time in the signal input period, contains both a down and an upsweep portion at about the same rate of frequency variation. By restricting B′ to the lower range of frequency variations as shown in FIGURE 7, there are always two vibrators operating in the intermediate and low frequency ranges where earth attenuation is seldom troublesome, while A′ and C′ alternately provide high frequencies, some of which may be almost completely attenuated, for increased resolution near the beginning and the end of the signal-input interval.

Figure 8:
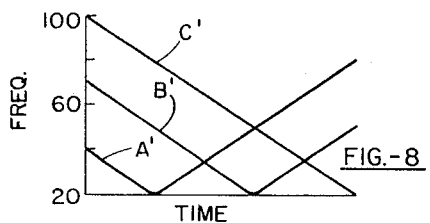

In FIGURE 8 is another pattern of frequency sweeps of similar properties, all starting as downsweeps at different portions of the frequency spectrum. As each downsweep approaches the desired lower limit, it reverses its direction of frequency change so as to be converted into an upsweep of similar character. This further emphasizes the use of low frequencies for transmission but still includes some of the high-frequency end of the spectrum by the initial portion of sweep C′.

Figure 9:
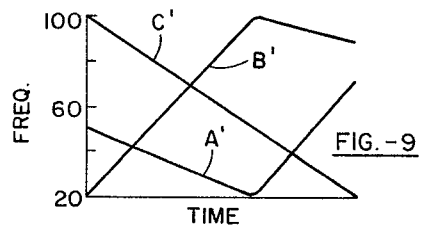

In FIGURE 9 is a still further pattern of frequency sweeps for three vibrators. Thus, sweep A′ starts as a slow downsweep and concludes as a rapid upsweep. B′ starts as a rapid upsweep over the entire frequency range and concludes as a slow downsweep at the upper portion of the range. The downsweep C′ covers the entire frequency range of interest at an intermediate sweep rate. These provide a rather uniform wide frequency range of coverage, and in various combinations possess substantial uniqueness due to the several different slopes occurring at different times in the signal-input period.

Figure 10:
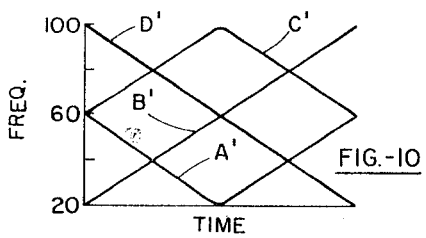
Figure 11:
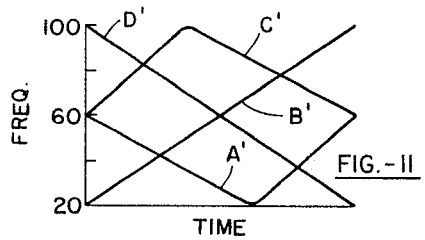

In FIGURES 10 and 11, are shown corresponding frequency sweep functions which might be used with four vibrators 15 in simultaneous use as in FIGURE 2, or with any number in parallel as in FIGURE 3. Thus, the counterpart signal A′ covers an intermediate-to-low range of frequencies as an initial downsweep followed by an upsweep. Simultaneously, the sweep C′ covers intermediate and high frequencies as an initial upsweep followed by a period of downsweep. At the same time, sweeps B′ and D′ cover the entire range of frequencies of interest as respective up and down sweeps throughout the entire period of signal input.

Additional uniqueness of signal may be provided by the four sweeps shown in FIGURE 11 wherein the slopes of the different sweep ranges are all somewhat different. For example, sweep A starts from an intermediate frequency as a slow downsweep and finishes as a rapid upsweep. Conversely, sweep C′ starts as a rapid upsweep and ends as a slow downsweep. The upsweep B′ occurs from a different lower limit at a somewhat different rate than the downsweep D′, which covers the entire frequency range of interest during the period of signal input.

It is true of both the sweep patterns of FIGURES 10 and 11 that, at substantially all times during the period of signal input, one of the sweep signals is traversing a low range of, for example, from twenty to forty cycles per second, two sweeps are passing through an intermediate range from, say, forty to eighty cycles per second, and one is in the high range above eighty cycles per second. From the widely different ranges of frequency coverage by choice of different ones or combinations of these four sweeps by the switching of a matrix like 32, but elaborated to make any combination or sum of four inputs, it is apparent that almost any sweep pattern can be obtained in the search for an optimum. Thus, it is unnecessary to conduct extensive sweep tests on the ground in an area before starting to survey the area routinely. By using a pattern of multiple sweeps simultaneously as disclosed herein the resulting counterpart signal always contains frequency components capable of being transmitted with substantial amplitude through the earth, while higher frequencies are also present to be transmitted at locations where that is possible. The choice of a form of sweep signal which may not be an optimum is thus avoided, and proper selection can be performed later at leisure during the analysis of the resulting records.

All of the vibrators 15 have been shown as of the same design or characteristics. This is not essential, however, as different ones can be designed to operate most efficiently over different frequency ranges and used, as in FIGURE 2, with the sweeps best adapted thereto.

While my invention has been described in terms of the foregoing specific embodiments and modifications, it is to be understood that still further modifications will be apparent to those skilled in the art. In particular, it should be emphasized that the specific values of frequency given in describing the character of the frequency sweeps used are exemplary only and are not to be construed as limiting my invention thereto. That is, the scope of the invention should not be considered as limited to the details set forth, but is properly to be ascertained from the appended claim.

I claim:

The method of determining travel times of vibratory seismic energy by various paths through the earth between two spaced points, by the steps of applying vibratory energy to the earth at one point for a substantial period of time, receiving at the other of said points the resultant seismic waves which arrive there along said paths, and cross-correlating a counterpart of said applied energy with said resultant waves to establish travel times by different respective ones of said various paths, in which method said energy-applying step comprises transmitting at said one point the sum of a plurality of time-frequency sweep functions differing substantially in frequency throughout most of said period of time, at least one frequency component of said sum being at all times during said period in a sufficiently low frequency range to avoid substantially complete attenuation along said paths, and at least one other frequency component of said sum being for at least a portion of said period higher than the upper limiting frequency which is substantially completely attenuated along said paths, said cross-correlating step comprises cross-correlating said resultant waves and a first counterpart of the sum of at least two but less than all of said differing time-frequency sweep functions, and including the further steps of cross-correlating said resultant waves with a second counterpart signal representing the sum of two time-frequency sweep functions different from those forming said first counterpart, and displaying the correlation function having the higher amplitudes to establish said travel times.

References Cited

UNITED STATES PATENTS

| | | | |
|---|---|---|---|
| 2,275,735 | 3/1942 | Cloud | 181—.5 |
| 2,981,928 | 4/1961 | Crawford et al. | 181—.5 |
| 2,989,726 | 6/1961 | Crawford et al. | 340—15.5 |
| 3,209,322 | 9/1965 | Doty | 340—15.5 |

BENJAMIN A. BORCHELT, *Primary Examiner.*

M. F. HUBLER, *Assistant Examiner.*